UNITED STATES PATENT OFFICE.

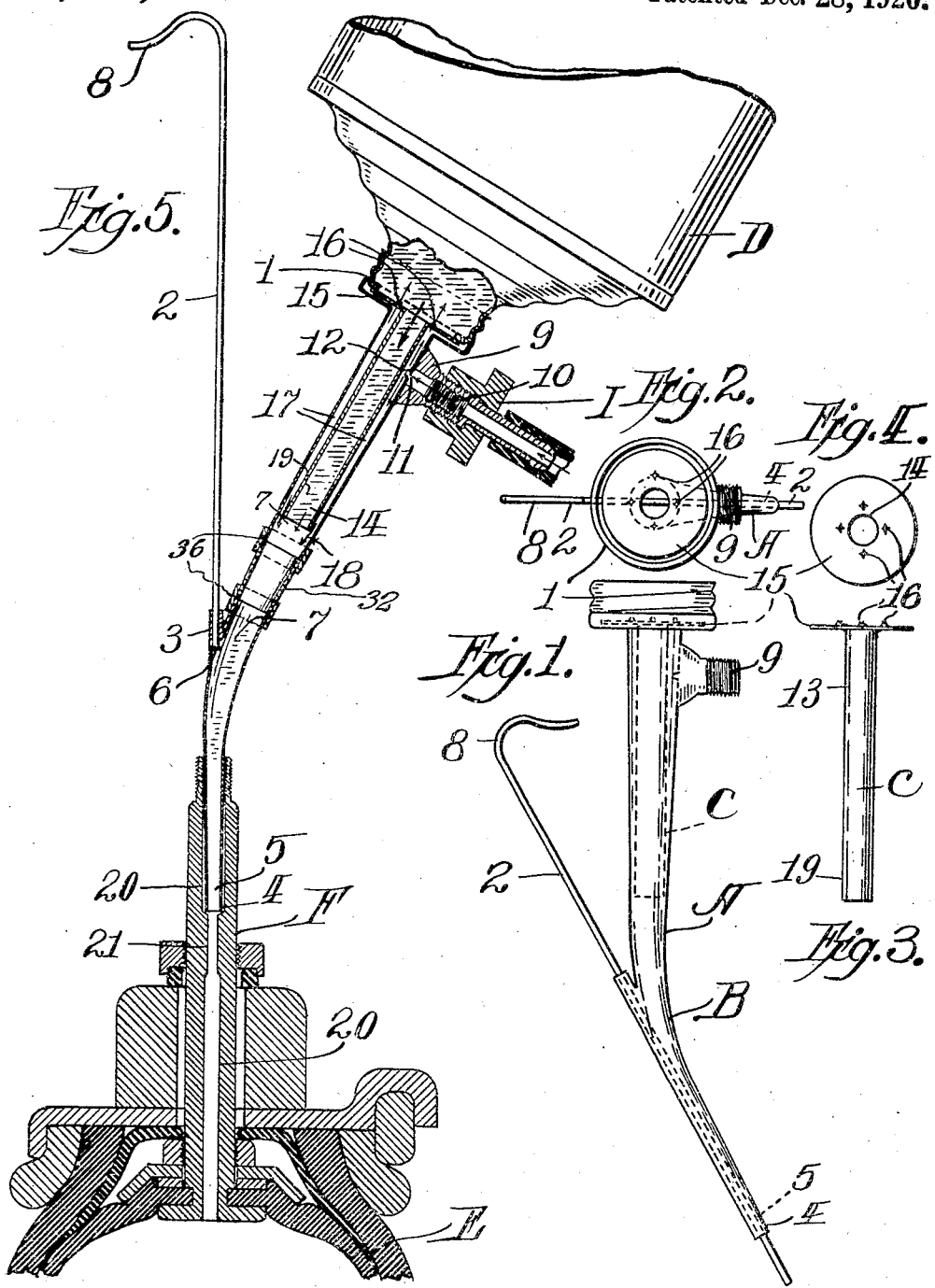

VICTOR H. ROEHRICH, OF ST. PAUL, MINNESOTA.

PNEUMATIC INJECTOR FOR PUNCTURE-CLOSING COMPOUND.

1,363,920.  Specification of Letters Patent.  Patented Dec. 28, 1920.

Application filed October 16, 1916. Serial No. 125,798.

*To all whom it may concern:*

Be it known that I, VICTOR H. ROEHRICH, a citizen of the United States, residing at St. Paul, in the county of Ramsey and State of Minnesota, have invented new and useful Pneumatic Injectors for Puncture-Closing Compound, of which the following is a specification.

This invention relates to a device for injecting puncture sealing tire compound into pneumatic tires, and is particularly adapted to automobile, aeroplane and bicycle tires, where it is desired to inject the tire compound or semi-liquid fluid of a fibrous nature into the inner or air tube of the tire. The nature of the ordinary tire compounds is to act as a puncture plugger, thereby, preventing leakage of the air through punctures in pneumatic tires.

The primary object of this device is to pneumatically inject the tire compound into the tire through the valve stem without removing the tire from the wheel, by simply removing the valve from the valve stem before injecting the compound.

A further object of this device is to prevent or overcome the clogging of the injecting tube, or valve stem, while injecting the compound.

It is also an object to pass the air through the injector and valve stem simultaneously with the passage of the compound, thereby, assisting to pass the compound through the small opening in the valve stem without clogging.

A further object is to agitate the compound while injecting the same by the pneumatic pressure which is adapted to force the compound into the tire, and to inject the compound directly into the tire from the container in which it is sold.

Other features of this device will be more clearly defined in the following specification and claims.

In the drawing which forms part of this specification:

Figure 1, is a side elevation of the injector.

Fig. 2, is a plan.

Figs. 3 and 4, are details of a portion of the same.

Fig. 5, is a longitudinal cross section of the injector attached to a container, only part of the container being shown, the end of the injector being inserted in position in the valve stem of a tire and illustrating a portion of the injector of a different form.

In the drawing, A represents an injector formed with a tapering nozzle, having a screw cap connection on the larger end, and a clearing wire or plunger 2 slidably connected and adapted to pass through the passage 3 and the small end 4 of the injector. When the clearing wire 2 is in the position illustrated in Fig. 1, it is adapted to close the passage 5 in the small end 4 of the injector A, and when in the position illustrated in Fig. 5, it is held from withdrawal from the passage or sleeve 3 by means of the enlarged end 6 formed on the wire 2, but is adapted to be practically withdrawn from the passage 7 in the enlarged part of the injector. The wire 2 is formed with a curved end or handle 8 on its upper end by which it can be engaged to operate the same.

An air inlet nipple 9 is formed or secured to the side or wall of the enlarged end of the injector A, and has a threaded outer and inner surface which is adapted to receive the ordinary air couplings used on air pump hose. The nipple 9 has a passage way 10 formed in the same, which is adapted to be connected with the passage 17 of the injector A by means of the opening 11. The opening 11 is preferably small and formed with burred inwardly projecting edges 12 to be hereinafter described. One or more openings may be made to connect the passage 10 with the passage 17.

A tubular air distributer C is positioned in the passage way 7 in the enlarged end of the injector A, and has a cylindrical body 13 formed with a longitudinal passage way 14, and a washer like head 15, which is secured to the body 13 at its upper end, and is formed with a series of burred openings or air passage ways 16. The distributer C is formed of such a diameter as to leave a narrow longitudinal passage 17 around the same in the injector when it is inserted in the passage way 7 of the tubular injector A, and a very small opening or passage 18 around the lower end 19 of the cylindrical body 13.

The tire compound is adapted to be put up and sold in suitable receptacles D, having the ordinary screw cap tops and either of a round or square construction.

When it is desired to insert the compound from the receptacle D into the tire E, a portion of which is illustrated in Fig. 5, the screw cap of the receptacle D is removed and the head 1 of the injector A screwed firmly to the receptacle D in place thereof, and the valve removed from the valve stem F in the ordinary way. The end 4 of the nozzle A being inserted in the passage way 20 of the valve stem F, and the clearing wire or plunger 2 withdrawn from the passage 5 into the position illustrated in Fig. 5. The air coupling 1 is then secured to the nipple 9, whereupon, air is forced through the passage way 11, as indicated by the light arrows. A portion of the air passing upward through the openings 16 in the air distributer C and through the tire compound to the top of the receptacle D, and some of the air also passing downward through the passages 17 and 18, and down through the passages 7 and 5, carrying with it the tire compound which is started down the passages 14 and 7, the air carrying the tire compound through the valve F into the tire E.

The air which passes up through the openings 16 tends to agitate the tire compound in receptacle D, thoroughly mixing the same and preventing the settling out of the heavier portions therein, or their clogging near the opening of the receptacle D, thus, allowing the compound to freely pass through the passage 14, the injector and valve stem. The air passing downward from the opening 11, and out of the passage way 18 will tend to draw the compound from the passage 14, and pass mixed with the compound through the valve stem F, thereby, easily and quickly forcing the contents of the receptacle D into the tire E.

As is illustrated in Fig. 5, the passage way 20 is formed with a restricted portion 21, which is apt to become clogged during the injecting of the compound. Should the passage way 21 or 5 become clogged during the injecting of the tire compound from the receptacle D, it can be easily and quickly cleared by forcing the clearing wire or plunger 2 down through the passage 5 and through the valve stem passages 21 and 20, and again withdrawing it into the position illustrated in Fig. 5, this operation taking only a moment without the removal of the injector nozzle A from the valve stem F.

Should it be desired to remove the receptacle D and injector A while the air pressure is in the same, the wire 2 can be slid into the position illustrated in Fig. 1, closing the passage 5 and allowing the removal of the injector without having any of the contents of the receptacle leak or escape out of the injector or container D. The wire 2 is a shut-off for the injecting end of the nozzle A.

The burred openings 11 and 16 form check valves when the pressure is shut off of the nipple 9 by acting in conjunction with the compound in the receptacle D. This is due to the fact that the compound is of a fibrous nature and when the pressure is withdrawn or cut off from the nipple 9, the pressure which is already injected into the receptacle D will force the compound against the burred openings and prevent any leakage therethrough. Thus, it is not necessary to put a check valve in the nipple 9, unless it is desired. The heavy arrows in Fig. 5, illustrate the progress of the compound from the receptacle D through the injector A.

It is an important feature that the compound in the receptacle D be agitated while the air is being applied, thus keeping the consistency of the compound uniform, and allowing it to easily pass from the receptacle and injector. Owing to the nature of the ordinary tire compounds used in pneumatic tires if the compound is not agitated while being injected, the heavy portion will settle to the lowest point in the receptacle which is where the outlet is located, as the receptacle is turned up side down during the injecting of the compound. If the compound is agitated at the same time it is being injected, it can be passed through a very small opening.

The construction of the injector illustrated in Fig. 5 is so arranged as to have a transparent tubular portion 32 flexibly connected to and interposed between the small end 5 and the enlarged upper end of the injector by flexible connections 36, thus allowing the operator to determine at a glance when the receptacle D is empty.

The material which my device is intended to inject is not heated but is a fluid at all ordinary temperatures, in which is suspended fibrous, flaky or granular material which plugs a puncture when it is forced into it by the pressure of the air in the tire. Such a puncture compound is naturally difficult to pass through the small opening formed in the ordinary valve stem and the puncture compound can only be introduced by a carefully tapered nozzle equipped with an air distributing means which functions to draw the compound through the nozzle, from the container, by a vacuum injector pump effect. The air distributing means in the nozzle causes the air to form a concentric stream or sheath of air which surrounds the compound and draws it into a spun-out thread-like string or stream and carries it air borne through the narrow aperture in the valve stem without plugging up the same. A large amount of air can be used relatively since only about a quart of compound is put in each tire.

In accordance with the patent statutes, I have described the principles of operation of my invention, together with the apparatus which I now consider to represent the best embodiment thereof, but I desire to have it understood that the construction shown is only illustrative, and that the invention can be carried out by other means, and applied to uses other than those above set forth within the scope of the following claims.

Having described my invention what I claim as new, and desire to protect by Letters Patent, is:

1. A pneumatic injector for puncture closing compounds, having a nozzle with a flexible portion, said nozzle being adapted to connect a compound container with the air passage of a tire, air distributing means in said nozzle for distributing the air received from a tire-filling air hose to draw and force the compound from said container whereby the contents of said container can be pneumatically injected into the air passage of a tire.

2. A pneumatic injector for puncture closing compounds, having an injecting nozzle which is adapted to be connected to a tire compound container, said injector having means for introducing a concentric stream of air which surrounds the stream of compound to carry the same through the valve stem into the air passage of a tire.

3. A pneumatic injector for puncture closing compounds, having an injecting nozzle which is adapted to be connected to a tire compound container, said injector having air distributing means which is adapted to form a concentric stream of air to draw said compound through said nozzle in a spun-out thread-like stream into the air passage of a tire.

4. A device of the class described, comprising, an injecting nozzle connected to a tire compound container, means to receive air from an air hose coupling, and means for distributing a portion of the air into the container to displace the compound, and also distributing a portion of the air directly through the nozzle, substantially as described.

5. A pneumatic injector for puncture closing compounds, having an injecting nozzle, which is adapted to inject puncture closing compound from a container into a tire, means on said nozzle for receiving air pressure from an air hose, air distributing means in said nozzle, whereby, when air is applied to said air receiving means, the compound in said container will be agitated, and forced simultaneously into the tire.

6. A pneumatic injector for puncture closing compounds, having an injecting nozzle, one end of which is adapted to be connected to a compound container, the other end being adapted to fit in the valve stem passage of a tire, means for conducting air into said container to force the compound therefrom into the air passage of said tire, and means for preventing a back pressure through said air conducting means from said container, thereby, preventing the compound from escaping through said air receiving passage, if the air supply is shut off.

7. A pneumatic injector for puncture closing compounds having an injecting nozzle, which is adapted to be connected to a container, means for receiving air into said container to force the contents of the same through said nozzle into a tire, a clearing wire slidably secured in said nozzle which is adapted to be used to clear the passage into said tire, and means for preventing the detachment of said wire from said nozzle.

8. A pneumatic injector for puncture closing compounds having a nozzle which is adapted to connect the container with the air passage of a tire, whereby when air is applied to said container, the contents of the same will be injected into said tire and said nozzle having a transparent portion which is adapted to indicate the flow of the compound from said container.

VICTOR H. ROEHRICH.